United States Patent [19]
Han

[11] Patent Number: 5,866,034
[45] Date of Patent: Feb. 2, 1999

[54] HEAT RESISTANT POLYMER COMPOSITION, ALIGNMENT LAYER FORMED USING THE SAME AND LIQUID CYRSTAL DISPLAY HAVING THE ALIGNMENT LAYER

[75] Inventor: Kwan-young Han, Incheon, Rep. of Korea

[73] Assignee: Samsung Display Devices Co., Ltd., Kyungki-do, Rep. of Korea

[21] Appl. No.: 889,506

[22] Filed: Jul. 8, 1997

[30] Foreign Application Priority Data

Jul. 8, 1996 [KR] Rep. of Korea .................. 96-27520

[51] Int. Cl.$^6$ .................. C09K 19/56; G02F 1/1337; C08L 79/04; C08L 63/00
[52] U.S. Cl. .................. 252/299.4; 349/123; 349/135; 428/1; 523/428; 525/928; 525/929
[58] Field of Search .................. 252/299.1, 299.4; 156/330, 331.2; 205/926; 349/123, 135; 525/928, 929; 523/428; 428/1

[56] References Cited

FOREIGN PATENT DOCUMENTS

| | | |
|---|---|---|
| 0099338 | 1/1984 | European Pat. Off. . |
| 0383976 | 8/1990 | European Pat. Off. . |
| 818509 | 1/1998 | European Pat. Off. . |
| 09-118853 | 5/1997 | Japan . |

OTHER PUBLICATIONS

Patent Abstract of Japan, vol. 096, No. 006, 28 Jun. 1996 & JP 08 034966 A (Sumitomo Bakelite Co. Ltd.), 6 Feb. 1996.

Patent Abstracts of Japan, vol. 015, No. 339, 28 Aug. 1991 & JP 03 133634 A (Toyobo Co. Ltd.), 6 Jun. 1991.

*Primary Examiner*—Shean C. Wu
*Attorney, Agent, or Firm*—Lowe Hauptman Gopstein Gilman & Berner

[57] ABSTRACT

A heat resistant polymer composition, an alignment layer formed using the same, and an LCD having the alignment layer are provided. The heat resistant polymer composition includes 10–25% by weight of a polyimide resin or polyamic acid, 0.1–1% by weight of an adhesive agent, and balance of a solvent. The adhesive agent improves thermal stability. Thus, the LCD having the alignment layer formed using the same can accomplish a desirable pre-tilt angle of liquid crystals and desirable alignment properties of liquid crystal molecules.

10 Claims, 1 Drawing Sheet

HEAT RESISTANT POLYMER COMPOSITION, ALIGNMENT LAYER FORMED USING THE SAME AND LIQUID CYRSTAL DISPLAY HAVING THE ALIGNMENT LAYER

BACKGROUND OF THE INVENTION

The present invention relates to a liquid crystal display (LCD) a heat resistant polymer composition and an alignment layer using the heat resistant polymer composition.

In general, a liquid crystal molecule has an intermediate property of a liquid and a solid, the fluidity of a liquid and the optical property of a solid, and can be changed in its optical anisotropy with an electric field or heat. A liquid crystal display (LCD) utilizes such properties and is typically used as a flat-panel display.

FIG. 1 is a schematic sectional view of a general LCD, in which transparent electrodes 3 and 3' composed of indium tin oxide (ITO) are respectively formed on upper and lower glass substrates 2 and 2'. Insulating layers 4 and 4' and alignment layers 5 and 5' for aligning liquid crystals are sequentially formed on the transparent electrodes 3 and 3'. Spacers 6 are disposed between the alignment layers 5 and 5' with a cell gap. A liquid crystal material is injected into the cell gap to form a liquid crystal layer 7. Polarizing plates 1 and 1' for polarizing incident and transmittant light are provided on the exterior of substrates 2 and 2'.

FIG. 2 shows a directional relationship between liquid crystal molecules and an alignment surface (substrate), in which a pre-tilt angle refers to the angle formed by the substrate surface and a liquid crystal director. An alignment layer must be formed by employing an appropriate alignment material or using an appropriate alignment method so that the pre-tilt angle of the liquid crystal can be adjusted to within a proper range, which is essential in improving the display performance of the LCD.

To form an alignment layer, a rubbing treatment has been generally used, that is, a polymer resin film such as a polyimide film is formed on a substrate where an electrode is formed and then the film is rubbed with a piece of cloth.

According to the rubbing treatment, an alignment layer composition including a polyimide resin is coated on the where an electrode layer formed and is then thermally treated at 200°~250° C. for about 1 hour and subjected to rubbing to form an alignment layer. To form a liquid crystal layer, a spacer is then coated on the substrate where the alignment layer is formed and the upper and lower substrates are sealed with a predetermined cell gap. Thereafter, a liquid crystal composition is injected into the cell gap and is thermally treated again at about 100° C. However, the alignment layer may be damaged by the heat treatment which disadvantageously changes the pre-tilt angle or alignment degree, resulting in deterioration of LCD performance.

SUMMARY OF THE INVENTION

To solve the above problem(s), it is an object of the present invention to provide a heat resistant polymer composition having excellent thermal stability.

It is another object of the present invention to provide an alignment layer formed of the heat resistant polymer composition and which can exert stable alignment characteristics.

It is still another object of the present invention to provide a liquid crystal display (LCD) with an improved display performance by an alignment layer which has excellent alignment characteristics.

Accordingly, to achieve the first object, there is provided a heat resistant polymer composition of which 10–25% by weight is a polyimide resin or polyamic acid, 0.1–1% by weight is an adhesive agent and the balance is a solvent.

Particularly, it is preferable that the adhesive agent and the polyimide resin or polyamic acid are mixed in a weight ratio of 0.5:99.5 to 6:94 on a solid weight basis.

The adhesive agent is not specifically restricted as long as a resin having adhesiveness, and an epoxy resin is preferably used. The weight average molecular weight of the epoxy resin is preferably 5,000 to 30,000.

The solvent used in the polymer composition according to the present invention is not specifically restricted, and chloroform or N-methylpyrrolidone (NMP) is preferably used.

The second object of the present invention is achieved with an alignment layer including the adhesive agent and polyimide or polyamic acid in a weight ratio of 0.5:99.5 to 6:94.

The third object of the present invention is achieved by an LCD having the alignment layer including the adhesive agent and polyimide or polyamic acid in a weight ratio of 0.5:99.5 to 6:94.

According to the present invention, the adhesive agent is added to the conventional composition for forming an alignment layer at an appropriate ratio, thereby improving the adhesiveness of the alignment layer with respect to the substrate. Also, while the epoxy resin and polymer are both aligned in the same direction during the rubbing treatment, the polymer chain can be fixed and the initial state of the rubbing-treated alignment can be retained even after liquid crystal injection or heat treatment.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT(S)

Figure 1:
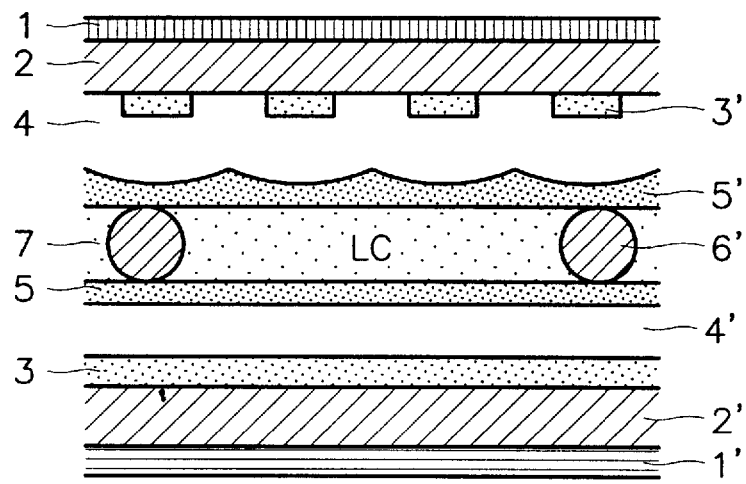
FIG. 1 is a sectional view of a general liquid crystal display.
Figure 2:
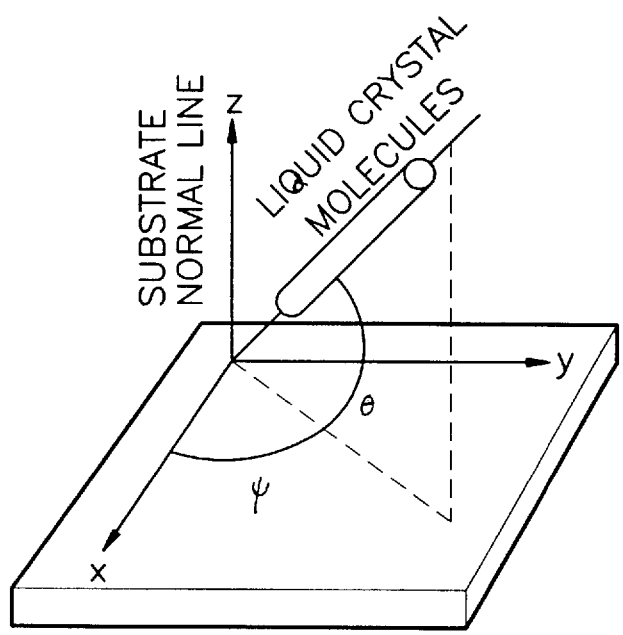
FIG. 2 is a diagram showing the directional relationship between liquid crystal molecules and an alignment surface (substrate).

In the present invention, there is provided a heat resistant polymer composition further comprising an adhesive agent, compared to the conventional composition made of polyimide, an alignment layer formed using the same, and an LCD having the alignment layer. As the adhesive agent, an adhesive epoxy resin having a weight average molecular weight of 5,000 to 30,000 is preferably used. It is preferable that the alignment layer includes an adhesive agent and a polyimide resin in a weight ratio of 0.5:99.5 to 6:94 on a solid weight basis. If the amount of adhesive agent with respect to the polyimide resin exceeds 6% by weight, the adhesiveness becomes too high to obtain a smooth rubbing treatment. If the amount of adhesive agent with respect to the polyimide resin is less than 0.5% by weight, the adhesive agent does not exhibit a desired effect.

Hereinbelow, the present invention will be described in more detail through detailed embodiments. However, the following embodiments are only examples of the invention and the scope of the invention is not limited thereto.

In the following examples and comparative examples, NMP was used as the solvent, Z10 manufactured by Aldrich Industries, Co., Ltd. was used as the epoxy resin, and RN 715 manufactured by Nissan Chemical Industries, Ltd. was used as the polyimide resin. These resins were used in the form of a solution (10%), respectively.

EXAMPLE 1

0.5 g of an epoxy resin solution and 99.5 g of a polyimide resin solution were mixed to form a polymer composition. The composition was uniformly coated on a glass substrate where an ITO electrode whose surface is cleaned was formed and heat-treated at about 220° C. for about 1 hour to evaporate and dry the solvent, thereby forming a polyimide resin layer, and rubbing the same to form an alignment layer. Subsequently, a spacer was coated using a conventional method, and upper and lower substrates were sealed. Then, liquid crystals were injected into the cell gap formed between the upper and lower substrates and heat-treated at about 100° C. for about 25 minutes.

After completing the LCD, the change in pre-tilt angles was observed by a crystal rotation method, and alignment properties of the liquid crystals of the liquid crystal layer was observed under a polarizing microscope.

EXAMPLE 2

With the exception of 3 g of an epoxy resin solution and 97 g of a polyimide resin solution being used, an LCD was fabricated in the same manner as described in Example 1. Then, the change in the pre-tilt angles and alignment properties of the liquid crystals were observed.

EXAMPLE 3

With the exception of 6 g of an epoxy resin solution and 94 g of a polyimide resin solution being used, an LCD was fabricated in the same manner as described in Example 1. Then, the change in the pre-tilt angles and alignment properties of the liquid crystals were observed.

Comparative Example 1

With the exception of an epoxy resin solution not being used, an LCD was fabricated in the same manner as described in Example 1. Then, the change in the pre-tilt angles and alignment properties of the liquid crystals were observed.

Comparative Example 2

With the exception of 0.2 g of an epoxy resin solution and 99.8 g of a polyimide resin solution being used, an LCD was fabricated in the same manner as described in Example 1. Then, the change in the pre-tilt angles and alignment properties of the liquid crystals were observed.

Comparative Example 3

With the exception of 8 g of an epoxy resin solution and 92 g of a polyimide resin solution being used, an LCD was fabricated in the same manner as described in Example 1. Then, the change in the pre-tilt angles and alignment properties of the liquid crystals were observed.

As a result, in Examples 1 through 3, little change in the pre-tilt angles was observed and liquid crystals were uniformly aligned, that is, the alignment property was good. On the other hand, in Comparative Example 1, the alignment of the liquid crystals was broken, that is, the alignment properties of the liquid crystals were not uniform. Also, the pre-tilt angles were not maintained to within a desirable range. In Comparative Example 2, the pre-tilt angles and alignment state of the liquid crystals were both inferior to the crystals of Examples 1 through 3. In Comparative Example 3, the excessive epoxy resin resulted in too much adhesiveness, thereby rendering material handling difficult.

As described above, since an adhesive agent is included in the heat resistant polymer composition of the present invention, the thermal stability of the same is remarkably enhanced. Thus, the change in pre-tilt angles of the liquid crystals or the breaking of alignment can be greatly reduced in forming an alignment layer using the heat resistant polymer composition and manufacturing an LCD. Therefore, the LCD manufactured according to the present invention has improved display characteristics.

What is claimed is:

1. A heat resistant polymer composition comprising 10–25% by weight of a polyimide resin or polyamic acid, 0.1–1% by weight of an adhesive agent, and the balance of a solvent, wherein the mixing ratio of the polyimide resin or polyamic acid to the adhesive agent is 99.50:0.5 to 94:6 on a solid weight basis.

2. The composition of claim 1, wherein the adhesive agent is an epoxy resin.

3. The composition of claim 2, wherein the weight average molecular weight of the epoxy resin is 5,000 to 30,000.

4. The composition of claim 1, wherein the solvent is at least one selected from the group consisting of chloroform and N-methylpyrrolidone.

5. An alignment layer comprising a polyimide resin or polyamic acid and an adhesive agent in a weight ratio of 99.5:0.5 to 94:6.

6. The alignment layer of claim 5, wherein the adhesive agent is an epoxy resin.

7. The alignment layer of claim 6, wherein the weight average molecular weight of the epoxy resin is 5,000 to 30,000.

8. A liquid crystal display (LCD) comprising an alignment layer having a polyimide resin or polyamic acid and an adhesive agent in a weight ratio of 99.5:0.5 to 94:6.

9. The LCD of claim 8, wherein the adhesive agent is an epoxy resin.

10. The LCD of claim 8, the weight average molecular weight of the epoxy resin is 5,000 to 30,000.

* * * * *